United States Patent [19]

Fiske

[11] Patent Number: 6,078,471
[45] Date of Patent: Jun. 20, 2000

[54] DATA STORAGE AND/OR RETRIEVAL METHOD AND APPARATUS EMPLOYING A HEAD ARRAY HAVING PLURAL HEADS

[76] Inventor: Orlo James Fiske, 122 Benicia Way, Oxnard, Calif. 93033

[21] Appl. No.: 09/004,819

[22] Filed: Jan. 9, 1998

Related U.S. Application Data

[63] Continuation of application No. 08/850,401, May 2, 1997.

[51] Int. Cl.[7] .............................. G11B 5/54; G11B 21/16
[52] U.S. Cl. ....................... 360/104; 360/105; 360/97.01
[58] Field of Search ...................... 360/97.01, 103–105

[56] References Cited

U.S. PATENT DOCUMENTS

| | | | |
|---|---|---|---|
| 3,579,214 | 5/1971 | Solyst ............................... | 340/174.1 F |
| 3,614,486 | 10/1971 | Smiley . | |
| 4,081,846 | 3/1978 | Roscamp et al. ....................... | 360/103 |
| 4,141,050 | 2/1979 | Wiseley .................................. | 360/104 |
| 4,435,736 | 3/1984 | Herman .................................. | 360/103 |
| 5,010,430 | 4/1991 | Yamada et al. ......................... | 360/103 |
| 5,041,932 | 8/1991 | Hamilton ................................ | 360/104 |
| 5,111,351 | 5/1992 | Hamilton ................................ | 360/104 |
| 5,296,985 | 3/1994 | Mochizuki et al. .................... | 360/105 |
| 5,426,539 | 6/1995 | Llewellyn et al. ...................... | 360/51 |
| 5,483,511 | 1/1996 | Jewell et al. .......................... | 369/44.37 |
| 5,644,457 | 7/1997 | Llewellyn et al. ...................... | 360/121 |
| 5,729,408 | 3/1998 | Kikitsu .................................. | 360/104 |
| 5,761,005 | 6/1998 | McKay et al. ......................... | 360/104 |

FOREIGN PATENT DOCUMENTS

| | | |
|---|---|---|
| 5-135518 | 6/1993 | Japan . |
| 6-243606 | 9/1994 | Japan . |

*Primary Examiner*—William Klimowicz
*Attorney, Agent, or Firm*—Foley & Lardner

[57] ABSTRACT

A data storage and retrieval system reads and/or writes data onto a data storage disk defining a recording surface having a radial dimension and at least one data track directed generally transverse to the radial dimension. The system includes a housing having an interior for receiving the one data storage disk. The disk is rotated upon being received in the housing interior. A head array having a plurality of read and/or write heads is arranged in a longitudinal dimension, for communicating with the recording surface of the data storage disk. A head array support arm is disposed within the housing interior, for supporting the head array adjacent the recording surface of the storage disk, with the longitudinal dimension of the arrangement of heads extending in a cross-track direction of the disk recording surface and spanning more than one half of the radial dimension of the recording surface. An actuator is coupled to selectively move the head array support arm and head array in a cross-track direction.

15 Claims, 14 Drawing Sheets

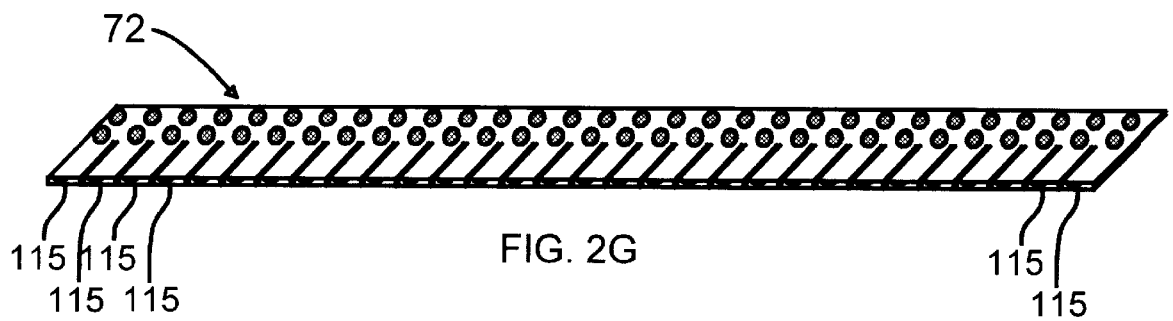
FIG. 2G
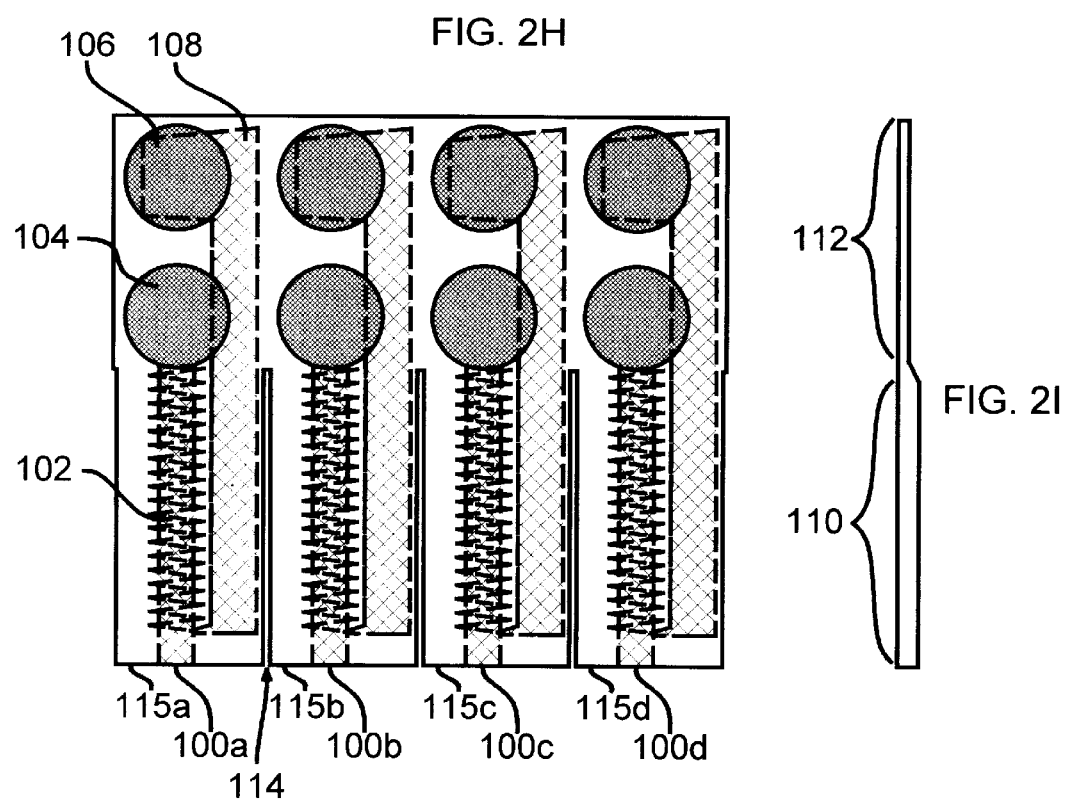
FIG. 2H
FIG. 2I
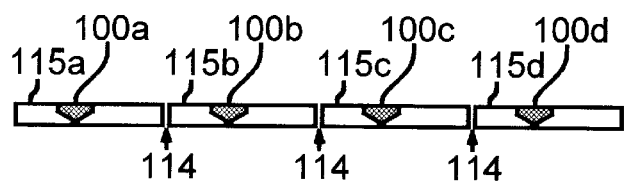
FIG. 2J

DATA STORAGE AND/OR RETRIEVAL METHOD AND APPARATUS EMPLOYING A HEAD ARRAY HAVING PLURAL HEADS

RELATED APPLICATIONS

This is a continuation of application Ser. No. 08/850,401 filed May 2, 1997, the contents of which is incorporated by reference herein.

FIELD OF THE INVENTION

The present invention relates, generally, to data storage and/or retrieval methods and apparatuses and components thereof and, in preferred embodiments, to a disk drive method, apparatus and components employing a head array composed of plural heads supported for operation with optical or electromagnetic recording disks.

BACKGROUND OF THE INVENTION

Since the advent of electronic computers several decades ago and the subsequent improvements in computation speed and efficiency, there has been an increasing need for a practical means to rapidly store and retrieve large volumes of digital data. Many types of mass storage devices have been developed and, after much trial and error, what is commonly referred to as the rigid disk drive or "hard drive" has become widely accepted. A majority of computers presently sold are accompanied by one or more hard drives. Explosive growth in the use of digital communications and multimedia has driven the demand for data storage even higher, while at the same time the acceptable data access latency has shrunk dramatically. Unfortunately, conventional disk drives are limited by mechanical considerations and thus have a difficult time keeping up with the developments.

In many of the most demanding applications, industry has resigned itself to the considerable expense of Redundant Arrays of Inexpensive Disks, referred to as RAID, often augmented by a large bank of fast-access semiconductor cache RAM, to increase storage capacity, reliability, data transfer rate and access speed. However, increasing the number of disks or disk drives does not decrease the worst-case data access time; a semiconductor cache memory only speeds access to the small fraction of data stored in the memory; and using disk arrays can more than double the cost per unit of data storage. In other applications the need for greater storage capacity and higher performance is also accompanied by the need for high durability and shock resistance, plus minimum size, power consumption and, of course, cost.

An example of a typical hard drive apparatus 10 is represented in FIGS. 1A and 1B. In general, the illustrated configuration includes a motor driven spindle 12 for supporting disks 14 and 15 for rotational motion about the spindle axis. For each disk surface, the apparatus also includes a read and/or write head 13 supported on a head slider 16, which is supported by a load beam 18 and a high speed actuator 20. Each read and/or write head (hereinafter referred to as "read/write head") can be either a read head, a write head or a multi-purpose read and write head. The actuator 20 is controlled to selectively move the head slider 16 radially across the disk surface, to locate the head adjacent selective data tracks on the disk. The illustrated apparatus also includes read/write and actuator control electronics 22 and voice coil motor means 23, for controlling the operation of each actuator 20 and head 13.

As shown in the side, cutaway view of FIG. 1B, the two disks 14 and 15 are mounted on a single spindle 12 with one slider devoted to each disk surface. Actual drives have employed more or less than two disks. The spindle 12 is rotatably driven, through a conventional high speed bearing 17, by a motor 19. As shown in the enlarged view in FIG. 1C, each slider 16 is suspended by a flexure 24 from the end of a load beam 18. The load beam 18 forces the slider 16 and head 13 toward the surface 26 of the disk. As the disk moves (in the direction represented by arrow 28) a film of rapidly moving air 30 is produced by disk motion. The rapidly moving air 30 along the disk surface creates an "air bearing" effect, which inhibits the slider 16 from making physical contact with the disk surface 26, thus minimizing wear.

The head/disk separation distance, also known as slider "flying height", is a critical parameter—decreasing it improves signal strength and, thus, allows higher data recording densities, but decreasing it too much can prompt a head "crash" in which the head impacts the disk surface, damaging or destroying one or both of them. Flying height has been steadily decreased over the years until disk drives are now designed with flying heights of 100 nanometers or less. Efforts are underway to decrease flying height even further, and various methods have also been proposed (see below) to minimize flying height variation caused by differences in disk surface speed relative to the head over the range of head travel.

High performance drives currently available, with disks 90 mm (3.5") in diameter, have a worse-case seek time (the time required to move the read/write head from the data track at one end of its range to the track at the other end) of nearly 20 milliseconds. In addition, they have a maximum rotational delay of 6 milliseconds (spinning at 10,000 RPM's). Thus the time required simply to begin a data transfer can be almost 26 milliseconds—a relatively long period of time for computers, especially those which handle data requests from thousands of simultaneous network users. Note that these times are for some of the highest performance disk drives. More typical drives are significantly slower. Improvements have been made in disk rotation rates, but increases in rpms promote an increase in shaft bearing friction, an increase in friction between disk surfaces and air in the disk chamber, increased power consumption by the disk motor to overcome this friction, increased heat production, and reduced longevity.

SUMMARY OF THE DISCLOSURE

Preferred embodiments of data storage/retrieval methods and apparatuses described herein comprise rigid disk drive systems with greatly improved data access speed, mechanical simplicity, and power consumption. Single channel Winchester-type magnetic read/write heads are replaced by linear magnetic read/write head arrays, supported by air-bearings, reducing required head movement from the usual range of several centimeters to a fraction of a millimeter. Head movement is accomplished by piezoelectric actuators, improving worst-case seek time by up to a factor of 100 or more compared to conventional systems. Independent actuator operation allows further decreases in average seek time and/or rotational latency with each head array and actuator assembly included in the system.

Disks are preferably rotated within a hermetically sealed chamber where increased hydrodynamic lift provided by increased slider dimensions permits reduced air pressure and a corresponding reduction in air friction and spindle motor power consumption. In preferred embodiments, these improvements are accompanied by a substantial reduction in mechanical complexity and the potential for reduced cost compared to conventional designs.

BRIEF DESCRIPTION OF THE DRAWINGS

A detailed description of preferred embodiments of the invention will be made with reference to the accompanying drawings, wherein like numerals designate corresponding parts in the several figures.

FIG. 2G is a perspective view of an embodiment of a head array slider which may be used in the apparatus of FIGS. 2A and 2B.

FIG. 2H is an enlarged, transparent, top view of a segment of the head array slider of FIG. 2G.

FIG. 2I is a side view of the head array slider of FIG. 2H.

FIG. 2J is an end view of the head array slider segment of FIG. 2H.

DETAILED DESCRIPTION OF THE PREFERRED EMBODIMENTS

Figure 1A:
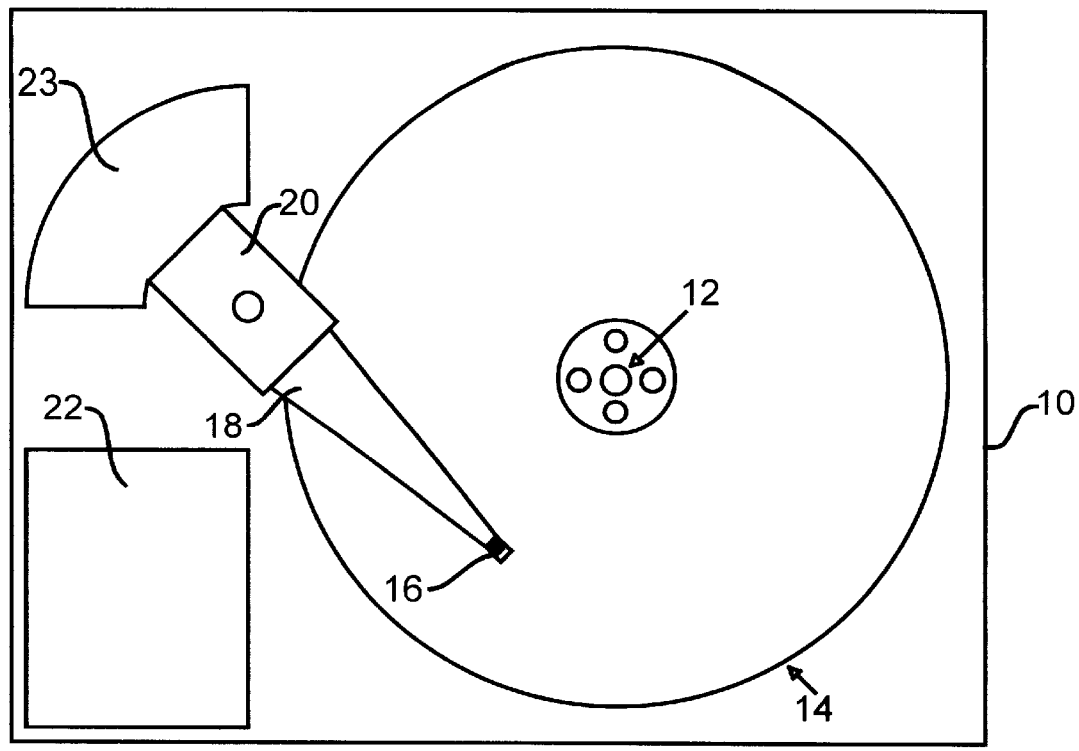
FIG. 1A is a top view of a typical hard disk drive using magnetic recording.
Figure 1B:
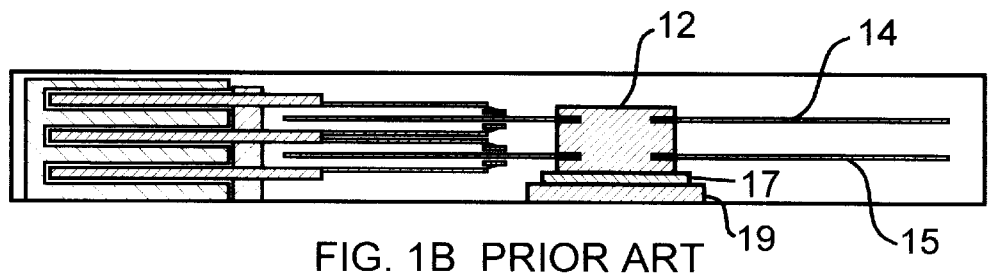
FIG. 1B is a side cross-sectional view of the disk drive shown in FIG. 1A.
Figure 1C:
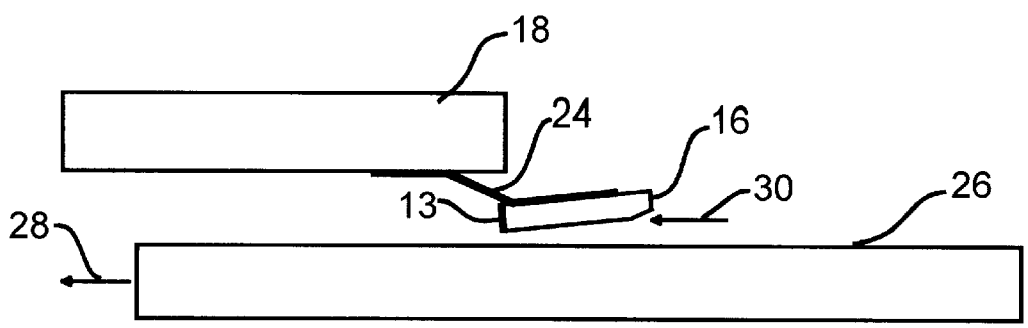
FIG. 1C is an enlarged side view of a magnetic head slider with air bearing as used in the disk drive shown in FIGS. 1A and 1B.

The following detailed description is of the best presently contemplated mode of implementing the invention. This description is not to be taken in a limiting sense, but is made merely for the purpose of illustrating the general principles of the invention. The scope of the invention is best defined by the appended claims.

The present invention relates, generally, to data storage and retrieval methods and apparatuses and components thereof and, in preferred embodiments, to disk drive systems for magnetic recording. While embodiments are described herein with reference to magnetic recording components, it will be understood that, where appropriate, optical or magnetic-optical reading or recording components may be employed in a similar manner in further embodiments of the invention. Embodiments of head arrays employing multiple optical or magnetic-optical reading or recording components are described in application Ser. No. 08/850,401 the descriptions of which are incorporated herein by reference.

A magnetic disk drive apparatus and components according to a first embodiment of the present invention are shown in FIGS. 2A–2J. The illustrated disk drive apparatus includes a housing 41 containing a spindle 42 with bearings, for example, of conventional design, supporting at least one disk for rotational movement about the spindle axis. A motor 50 is operatively coupled to the spindle 42 for rotating the spindle and supported disk(s). In the illustrated embodiment, two disks 48 and 49 are supported by the spindle 42 in a disk-receiving area of the housing 41. However, it will be understood that further embodiments may be readily designed to operate with any suitable number of disks. Suitable electronics for controlling the spindle motor 50, read/write components and head assembly actuator movements are represented by box 51. While shown in block form in the drawings, it will be understood that electronics for controlling spindle motors, as well as electronics for controlling read/write components and electronics for controlling actuator movements are readily understood by those skilled in the art, and the connections (also not shown) between such electronics and the corresponding disk drive components are also readily understood by those skilled in the art.

An apparatus according to preferred embodiments of the present invention includes a head assembly which can greatly reduce seek time (the time required to move a read/write head to a position adjacent the appropriate data track on the disk). The illustrated head assembly embodiment includes a head array support arm 70 supporting a head array 72 having a plurality of individual read/write heads (FIG. 2C). The support arm 70 has a first end 74 coupled to a flexible cross brace 76 and a second, opposite end 78 coupled to a pivotal lever member 80. The pivotal lever 80 is mounted for pivotal motion about a pivot point 82 by selective actuation of an actuator 84. Selective energizing of the actuator 84 causes selective actuator motion in the direction of double arrow 86, which is transferred through the pivotal lever 80 to selective movement of the head array support arm 70 in the direction of double arrow 88. In this manner, the head array 72 suspended from the head array support arm 70 may be selectively moved relative to the disk surface 57, generally in the radial direction of the disk.

Figure 2A:
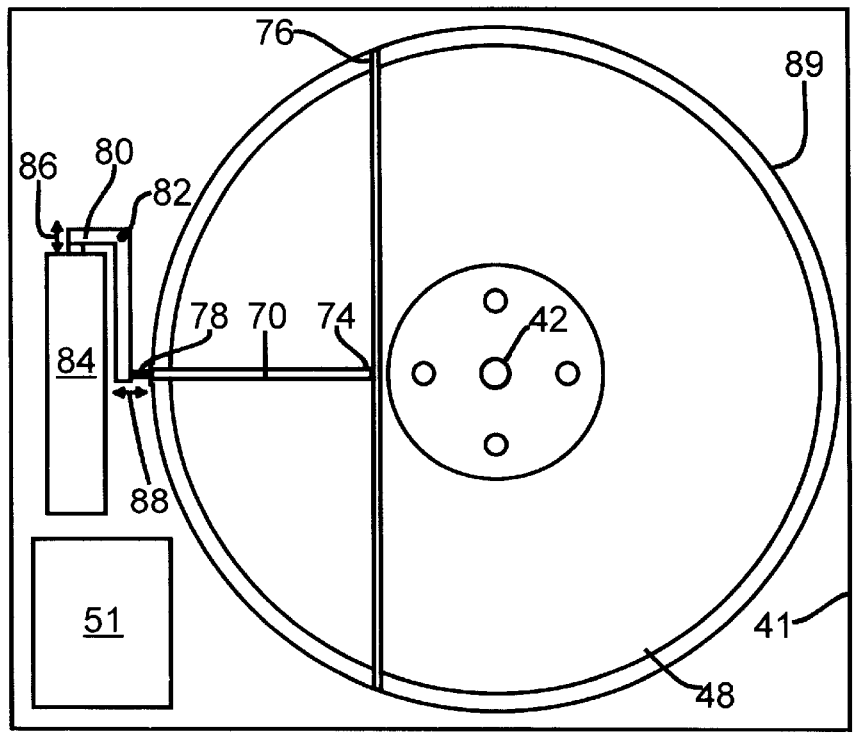
FIG. 2A is a top view of a disk drive apparatus employing a head array slider arm assembly and a piezoelectric actuator according to a first embodiment of the present invention.
Figure 2B:
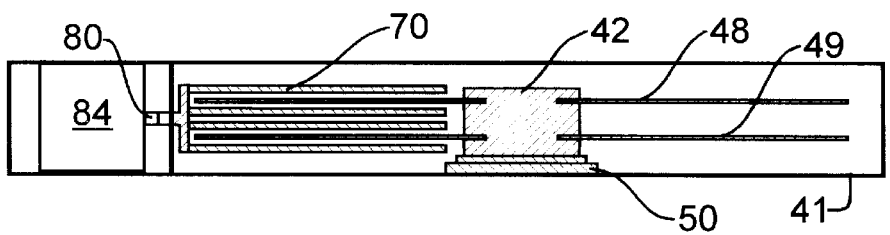
FIG. 2B is a side cross-sectional view of the disk drive apparatus of FIG. 2A.
Figure 2C:
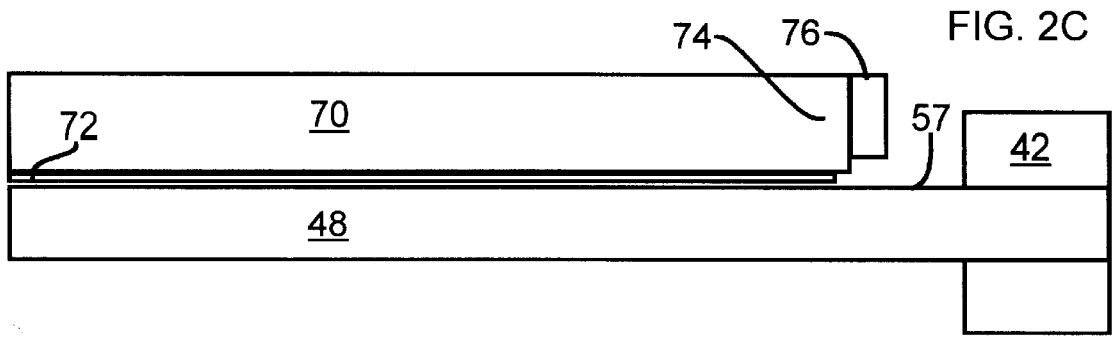
FIG. 2C is an enlarged side view of an embodiment of an arm assembly which may be used with the apparatus of FIGS. 2A and 2B, showing the end adjacent to the disk spindle.

In the embodiment of FIGS. 2A–2C, the actuator 84 is a piezoelectric "stack" actuator, constructed of multiple layers of a piezoceramic material that expands or contracts almost instantaneously in response to an applied voltage, thus providing a short movement stroke but with high force and very high speed. Stroke length may be increased using mechanical amplification techniques, such as the pivoting lever arrangement shown in FIG. 2A or other suitable amplification structure. Alternatively, the actuator 84 may be directly connected to head array support arm 70. Piezoelectric stack configurations and control technology is known in the art, for example, as described in U.S. Pat. No. 4,841,191 to Takata et al. (for use in a "superfine positioning apparatus") and in U.S. Pat. No. 3,614,486 to Smiley (for "high-speed printer hammers and the like). However, other well known piezoelectric (or piezoceramic) configurations including, but not limited to, bimorph-type disk, beam, or cantilever designs may be used in further embodiments. Also, in yet further embodiments, actuators other than piezoelectric (such as, but not limited to, electromagnetic solenoid actuators, electrostrictive devices, electrostatic devices, piezoceramic devices or the like) may be used as actuator 84. However, piezoelectric (and more preferably, piezoelectric stack) actuators are preferred due to their reliability, actuation speed and accuracy.

As discussed above, the head array support arm 70 is coupled to the actuator 84 (through pivotal lever 80) at one end 78, and a flexing cross brace 76 at the other end 74 of the arm. The support arm 70 is preferably made of a material having sufficient strength and rigidity for supporting the head assembly adjacent the disk surface, including, but not limited to, metals such as aluminum, plastics, composite materials or the like. The flexing cross brace 76 is made of a material that provides sufficient strength and rigidity for supporting one end of the support arm and sufficient spring-action restoring force to assist the actuator 84 in returning the head support arm 70 to its starting position after a read or write excursion. Suitable materials for the cross brace 76 include, but are not limited to rigid metals such as spring metals, plastics, composite materials, or the like.

Alternatively, the cross brace may be constructed such that it is rigid both in the direction perpendicular to the disk surface and in the direction parallel to the disk surface, in which case the support arm may be attached to the cross brace by a sliding or flexing attachment. The cross brace will then serve primarily to maintain separation between the adjacent end of the support arm and the disk surface.

A cross-sectional side view of a disk drive apparatus according to the first embodiment is shown in FIG. 2B, and includes two disks (more or less may be employed in further embodiments), four head array support arms, four cross braces, and four head array assemblies, one for each disk surface.

FIG. 2C is an enlarged side view of a segment of a single head array support arm and its associated cross brace. At operational speeds, the rapidly spinning surface 57 of the disk 48 carries a layer of air typically about 300 microns thick along with it at approximately the same speed. This layer is commonly known as the "boundary layer". The cross brace is preferably spaced at sufficient distance from disk surface 57 to avoid substantial interference with this boundary layer, thus minimizing air friction and the associated increase in spindle motor power consumption.

Figure 2D:
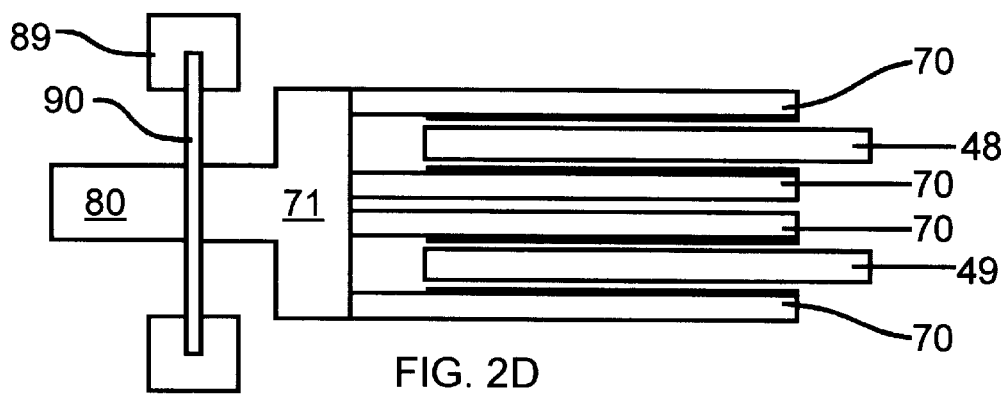
FIG. 2D is an enlarged side view of an embodiment of an arm assembly which may be used with the apparatus of FIGS. 2A and 2B, showing the end adjacent to the actuator.

FIG. 2D is an enlarged side view of the outer end of all four support arms of a preferred embodiment of the FIG. 2B structure. In the FIG. 2D embodiment, spindle 42, disks 48 and 49, and the four head array support arms 70 are contained in a partially evacuated hermetically sealed chamber. In one embodiment, the sealed, partially evacuated chamber is defined by the walls of the housing 41. However, in preferred embodiments, a chamber wall 89 defines a partially evacuated chamber located within the housing 41, with the disks and support arm 70 located within the chamber interior and the actuator 84 and pivotal lever 80 located outside of the chamber interior. The support arms are attached, preferably through an arm support block 71, to a flexible air-tight seal 90 in the chamber wall 89, which, in turn, is attached to the pivotal lever 80. The seal 90 preferably hermetically isolates the chamber interior from the portion of the housing 41 containing the actuator 84 and pivotal lever member 80.

When activated, the actuator 84 causes the pivotal lever 80 to pull (or push) against the flexible seal 90 which in turn pulls (or pushes) the head array support arms radially away from (or toward) the center of the disk. When actuator force is reduced after a read or write excursion, exterior air pressure acting against the seal supplies a spring-action restoring force to assist actuator 84 in returning the head array support arm to its starting position. Thus no moving components penetrate the wall of the hermetically sealed chamber at any point and the possibility of air leaking into the chamber is minimized. Suitable materials for the flexible seal include, but are not limited to semi-rigid metals such as spring metals, plastics, composite materials, or the like, as well as more flexible materials, such as, but not limited to, rubber or rubber-like polymer materials. While a flexible seal arrangement is preferred, so as to avoid the passage of moving parts through the wall of the sealed chamber, other embodiments may employ suitable mechanical linkages that pass through one or more openings in the chamber, and which operate with suitable seals for sealing the openings around the linkages. Further embodiments include the actuator and appropriate mechanical linkage within the sealed chamber, so as to avoid the need to transfer mechanical motion through the chamber walls.

Figure 2E:
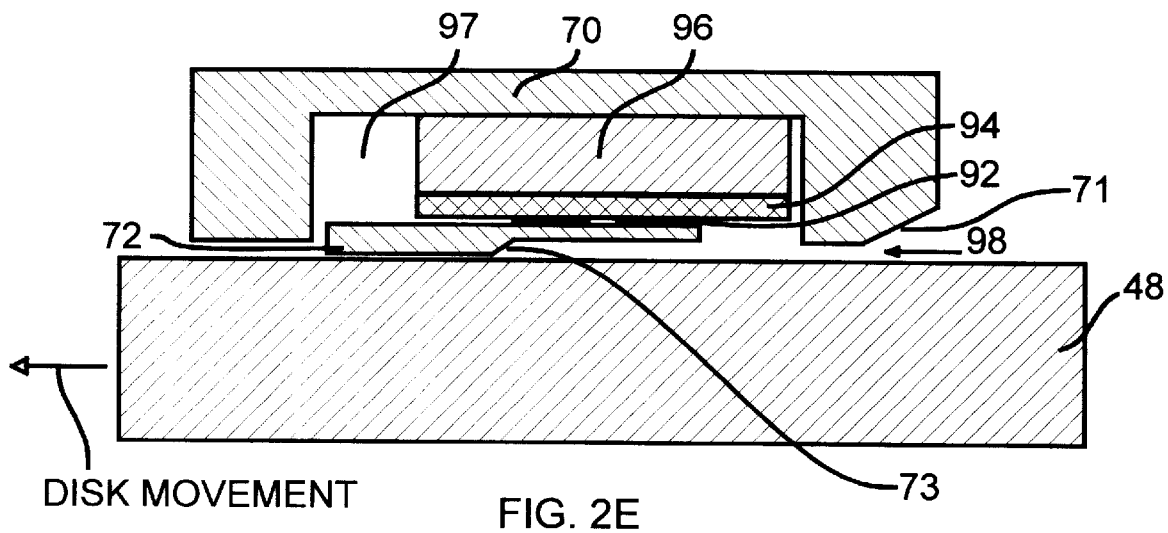
FIG. 2E is an enlarged cross-sectional view of an arm assembly which may be used with the apparatus of FIGS. 2A and 2B as it appears during operation.

An enlarged cross-sectional view of a preferred embodiment of the head array support arm 70 and its associated head array assembly is shown in FIG. 2E. The head array assembly in FIG. 2E includes a head array slider 72, arm electronics chip 94, and an expandable core 96, all supported within a longitudinal channel 97 within the support arm 70. The channel 97 preferably extends along the entire length of the support arm 70 and is open toward the disk 48.

In preferred embodiments, the arm electronics chip 94 and head array slider 72 form a single unit, electrically connected, for example, using conventional solder bump technology, allowing many electrical connections (via solder bumps 92) in a very small area. The head array slider 72 contains an array of magnetic read and/or write heads, while the arm electronics chip 94 contains the associated head selection, preamp, and drive circuitry. The arm electronics chip 94 is coupled for electrical communication with the suitable read/write control electronics 51. Solder bump coupling between the arm electronics chip 94 and the head array slider 72 provides low electrical resistance, low inductance, and very short distance between circuitry on the arm electronics chip and the heads on the head array slider, improving signal-to-noise ratio and signal bandwidth as compared to the relatively long connections required by a conventional magnetic disk head assembly.

Figure 2F:
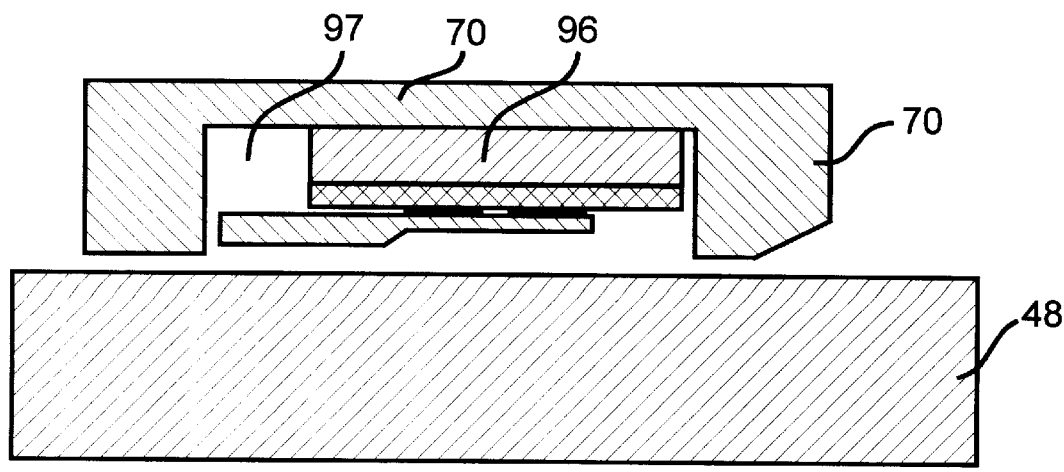
FIG. 2F is an enlarged cross-sectional view of the arm assembly of FIG. 2E as it appears when not in operation.

The expandable core 96 has an expanded state, as shown in FIG. 2E and a contracted state, as shown in FIG. 2F. In the expanded state (FIG. 2E), core urges arm electronics chip 94 and head array 72 toward the adjacent disk surface. The end of the head array slider 72 (the thin end in the illustrated embodiment) which is attached to the arm electronics chip 94, is spaced far enough from the disk surface to avoid any possibility of inadvertent—and potentially disastrous—contact, typically several microns. In the illustrated embodiment, the other end of the slider is thicker, placing it closer to the disk surface, and is configured as a cantilever. Rapidly moving boundary layer air 98 passing between the surface of the disk 48 and the slider 72 is compressed, producing high pressure and forcing the slider away from the surface in an effect known as an "air bearing". Support arm suspension height, core expansion, slider thickness, slider flexibility, and air pressure within the hermetically-sealed disk chamber are all selected to ensure that slider "flying height" (distance from the disk surface during operation) is maintained within necessary parameters. Optimization of magnetic signal transfer between read and/or write heads on the slider 72 and data tracks on the disk surface requires that flying height be as low as possible, without actual contact, and is normally less than 100 nanometers.

In preferred embodiments, the support arm 70 is provided with an angled or beveled edge 71 facing the air flow 98, such that air is more easily directed into a space between the support arm 70 and the disk surface. In addition, the head array slider 72 is preferably provided with an angled or beveled edge 73 facing the air flow 98, to help direct air into a space between the slider 72 and the disk surface.

In order to minimize head flying height and maximize data storage density in typical disk drives, both the disk and the head slider are polished to extreme flatness. However, if the slider and disk come into contact when the disk is not spinning this very flatness creates "stiction", i.e. static friction. If the contacting surfaces are too flat, stiction can be high enough to overwhelm the torque of the spindle motor, thus preventing system startup and rendering the disk drive inoperable. Manufacturers attempt to prevent such an occurrence, either by ensuring that the surfaces are not too flat (thereby limiting data density) or by "parking" the head slider in a "landing zone" where the disk surface has been specially textured to avoid stiction (thus eliminating any possibility of data storage in that area).

FIG. 2F illustrates an improved method according to preferred embodiments of the present invention to avoid stiction. FIG. 2F illustrates the same structures as shown in FIG. 2E, however, with the core 96 in the non-expanded (or retracted) state, as when the system is not in operation, e.g. when system power is off. In the contracted state, the core 96 is now contracted in width relative to the expanded state shown in FIG. 2E, to lift the head array away from the disk surface and draw it into the support arm cavity, eliminating (or at least minimizing) any possibility of head-disk contact or stiction on system startup. Both the disk surface and the head slider 72 may be polished to any degree of flatness achievable, and no portion of the disk surface need be reserved as a landing zone. In preferred embodiments, the core automatically reverts to its non-expanded state when system power is off, to provide the capability for "fail-safe" operation—if system power is accidentally lost during operation, the core contracts before the disk spins down.

Means to accomplish core contraction include, but are not limited to, piezoelectric, electrostatic, magnetic, electromagnetic, pneumatic, or mechanical devices. In one embodiment, the expandable core may comprise, for example, a piezoelectric actuator structure (such as described above with respect to actuator 84) and is controlled to expand or contract by the application of an electronic signal provided by suitable control electronics 51. Other embodiments of expandable core structures are described in application Ser. No. 08/850,401 (with respect to the expandable arm 70 described with reference to FIGS. 4E and 4F of that application), the descriptions of which are incorporated herein by reference.

In preferred embodiments, in place of a single magnetic read and/or write head, the head array comprises a linear arrangement of plural heads, spaced at suitable intervals, such as from about 50 microns to about 500 microns and, preferably, about 100 microns spacing between adjacent heads. A section of a preferred head array 72 is shown in a perspective view by FIG. 2G. An enlarged, top view of a segment of such an array, including four inductive-type read/write heads 100a, 100b, 100c and 100d, is shown in FIG. 2H.

In preferred embodiments, as illustrated, the heads 100a–d employ helical magnetic coils 102, rather than planar coils, to minimize head width, thus, maximizing the number of heads within a fixed array length and minimizing the distance the array must be moved by the actuator 84 to position a head over a particular data track. However, other embodiments may employ other types of heads, including, but not limited to planar coil heads, optical heads, magnetorestrictive heads, or the like. In preferred embodiments employing helical coil heads, each head in the array is provided with a helical coil 102 which is wrapped around a central yoke, with a bonding pad 104 connected directly to one end of the coil and a second bonding pad 106 connected by means of lead conductor 108 to the other end of the coil. Read signals are transmitted through these bonding pads and the attached solder bumps to the arm electronics chip 94, and write signals are sent via the same path in the opposite direction. FIG. 2J shows an end view of this same section of head array, revealing a conventional pole structure for each head. The head array is designed to be manufactured as a single component, using techniques generally known to one skilled in the art.

FIG. 2I shows a side view of the head array segment of FIG. 2H, revealing the thicker cantilever air-bearing section 110 and the thinner bonding pad section 112. As shown in FIG. 2G and magnified in FIG. 2H, a narrow gap 114 is etched, cut or otherwise created, between the thicker cantilever sections of each head element. This provides a plurality of flexible "fingers" 115a–d, each of which is free to move up and down substantially independent of other fingers, to follow local variations in the disk surface, allowing very low flying height while minimizing incidental contact.

Conventional sliders are typically designed to be moved across the full width of a disk's data storage area, and thus experience almost a factor of two variation in surface linear velocity. Such sliders have been provided with relatively complex contours, machined to interact with air flow and compensate, to some degree, for these velocity variations, to attempt to maintain the slider at a nearly constant flying height above the surface. In preferred embodiments of the present invention, on the other hand, the head array 72 spans a substantial portion (if not all) of the width of the recording surface and, thus, is moved only a very short distance, generally radially, a few hundred microns or less to place the nearest head over a selected track location. Therefore, each segment of the under-surface of the head array may be designed to provide the appropriate aerodynamic interaction with the air stream above the disk over a very narrow radial range. Complex shapes and contours designed to interact with a large variance in air flow velocity are not necessary, thus simplifying the manufacturing process and decreasing the probability of head damage during machining.

The lift provided by an air-bearing surface is proportional to its area. Because the air-bearing surface area of the preferred head array slider 72 is, for example, ten or more times larger than the corresponding area of a conventional slider, its lift is also about ten or more times larger (for a given ambient air pressure). The increased lift of the head array 72, in combination with the hermetic disk chamber, can provide significant advantages with respect to spindle motor power. At high rotation speeds a spindle drive motor consumes a substantial amount of electric power simply to overcome friction, stressing the spindle bearings and producing excess heat. But with the abundance of lift now available to maintain the head array away from the disk surface, a significant fraction of the air may be withdrawn from the chamber, thereby reducing ambient air pressure to reduce air friction and, thus, decrease power consumption and spindle bearing stress and allow higher rotation speed. Higher rotation speed reduces rotational latency, which can reduce data access time, and increase system performance.

In preferred embodiments, disk surface data tracks are accessed by electronically activating the closest magnetic head element in the head array and by directing the piezoelectric actuator 84 to move the head array support arm 70 until that element is directly over the desired track location. Selection and activation of one or more specific heads in the array may be accomplished with a suitable selection circuit, employing, for example, conventional switching and selection techniques and may be controlled by control electronics 51.

Preferably the head array assembly includes a slider 72 that spans substantially an entire radius of the recording surface. Each data track may be, for example, about two microns wide (more in some implementations and less in others) and each read/write head element services all data tracks within its specific, narrow band of disk surface. Thus, for example, for a 90 mm (3.5") disk and a 25 mm linear head array with 100 elements, the maximum required head movement is about 250 microns. Using commercially available piezoelectric actuators and appropriate mechanical amplification this range of movement, which corresponds to the worse case seek time for the disk drive, can be accomplished in about 250 microseconds. Implementations with more head array elements and/or a smaller disk diameter can reduce the maximum movement distance and time proportionately. Positioning heads over closer data tracks also requires proportionately less time. Since the piezoelectric head position actuator is capable of far higher speeds than conventional actuators, data tracks may be narrower than in disks used with other magnetic disk drives, without exceeding the ability of the system to react in time to maintain alignment.

In preferred embodiments, one or more dedicated data clocking tracks may be included on the disk surface to help maximize linear recording density. The system may also be designed to allow multiple tracks to be read or written simultaneously (using multiple heads in the head array simultaneously), thus multiplying the data transfer rate.

Figure 3A:
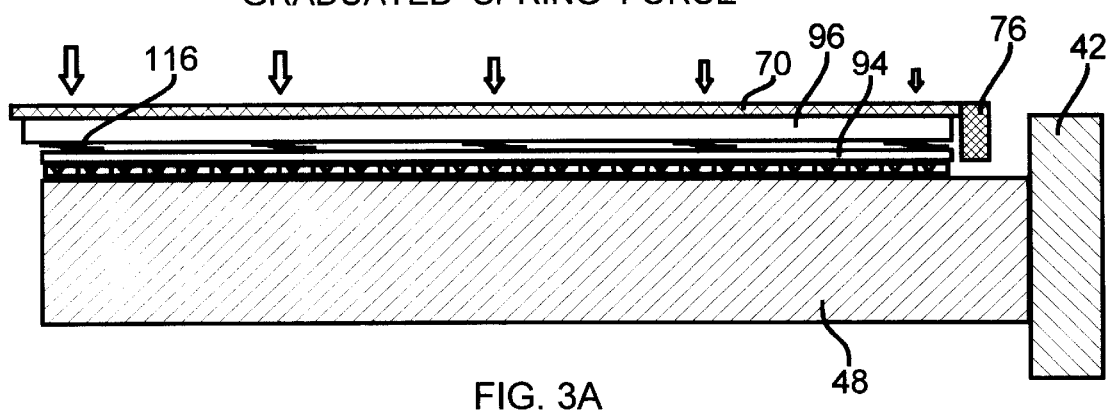
FIG. 3A is a side cross-sectional view of an arm assembly for a disk drive apparatus according to a second embodiment of the present invention.
Figure 3B:
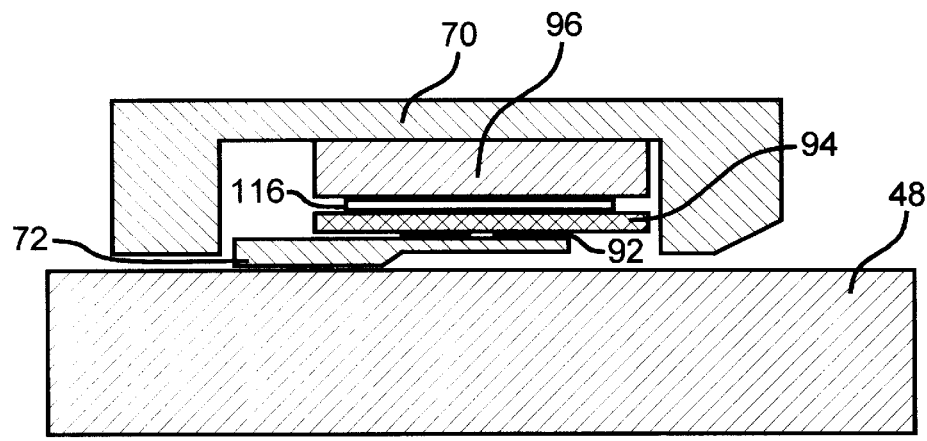
FIG. 3B is an enlarged cross-sectional view of the arm assembly of FIG. 3A, with the cross-section taken perpendicular to that of FIG. 3A.

FIG. 3A shows a side cross-sectional view of a head array support arm and its associated cross brace according to a second preferred embodiment of the present invention. The support arm 70 is coupled to the cross brace 76 at one end and to a pivotal lever 80 (FIG. 2A) at the other end, as before. The difference lies in the structure of the arm itself. In the FIG. 3A embodiment, the expanding core 96 is separated from the arm electronics chip 94 by means of spring-action flexures 116. FIG. 3B shows an enlarged cross-sectional view of the head array assembly of FIG. 3A, where the cross-section is taken perpendicular to that of FIG. 3A. The arm electronics chip and the head array may be identical to those described above with respect to the first embodiment.

In operation, the flexures act in conjunction with the flexible fingers of the head array to provide two levels of movement. The head array fingers react to high-frequency local variations in air-bearing pressure created by local variations in the disk surface, while the flexures react to broad, lower frequency surface variation averages. This can provide better overall system response to variations in the disk surface. In addition, the flexures may be designed with mutually different spring forces and arranged along the length of the head array support arm, such that the spring forces of the flexures gradually increase from the inside diameter (ID) to the outside diameter (OD) of the disk, to compensate for the corresponding increase in air bearing pressure resulting from the higher linear velocity at the disk perimeter. This can help maintain all head elements at substantially the same flying height along the full length of the head array, thus providing the best possible read and write signals for the maximum data density.

Figure 4:
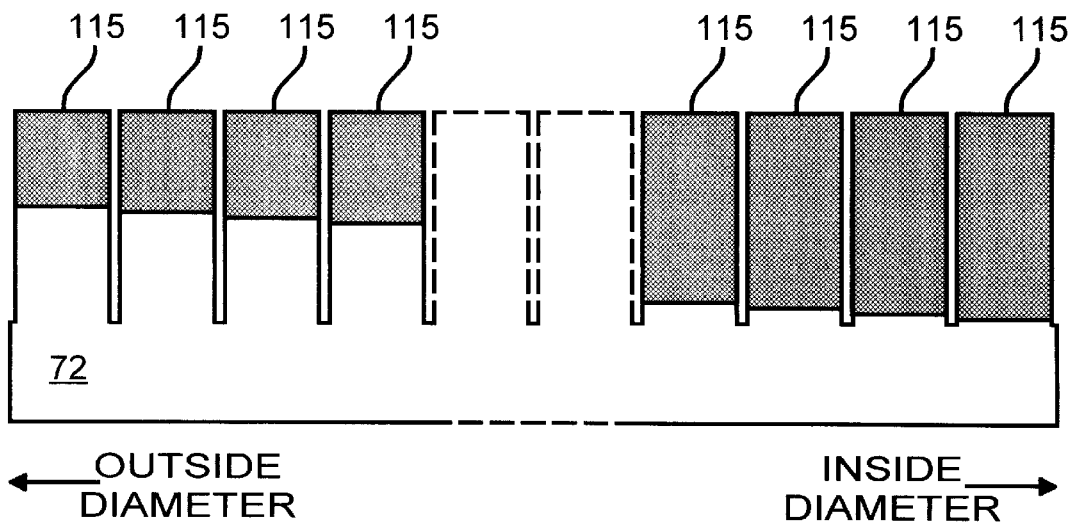
FIG. 4 is a bottom view of a head array slider for a disk drive apparatus according to a third embodiment of the present invention.

FIG. 4 shows an enlarged bottom view (as seen from the disk surface) of the head array slider 72 according to a third embodiment of the present invention. This embodiment is substantially the same as the first embodiment except that here, the thicker part of the head array includes differing portions of the lengths of the head array fingers. More specifically, the portion of the finger length having the thicker dimension is greater for fingers located toward the inside diameter than the outside diameter and, preferably, the thicker portion of the fingers gradually decreases in length from the finger at the ID to the finger at the OD. This is represented in FIG. 4, wherein the thicker portion of the head array (110 in FIG. 2I) is represented as the shaded portion of the fingers 115. As with the graduated spring force in the previous embodiment, this can help compensate for the increase in air bearing pressure resulting from the higher linear velocity at the disk perimeter and helps maintain constant head flying height. Graduated air bearing surfaces may be used alone, or in conjunction with graduated spring force flexures.

Figure 5:
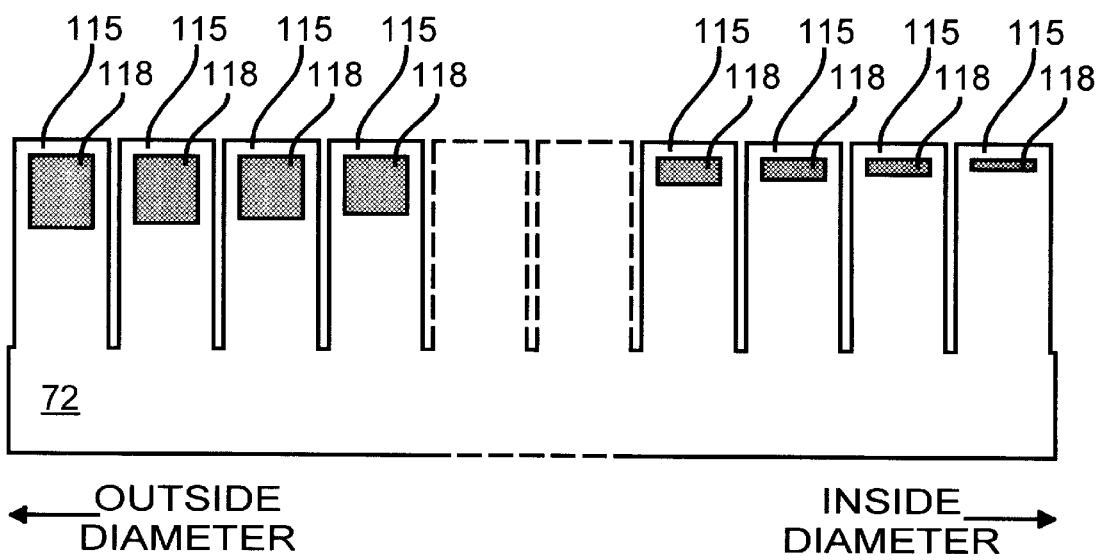
FIG. 5 is a bottom view of a head array slider for a disk drive apparatus according to a fourth embodiment.

FIG. 5 shows an enlarged bottom view (as seen from the disk surface) of the head array slider 72 according to a fourth embodiment of the present invention. The FIG. 5 embodiment is substantially the same as the first embodiment, except for the addition of cavities (shown as shaded regions 118) in the underside of the head element fingers 115. Each cavity 118 reacts with rapidly passing air to create negative pressure regions that serve to effectively pull the associated finger 115 closer to the disk surface and stiffen the finger's spring response. Typically, the greater the cavity dimension, the greater the negative pressure and, thus, the greater the force on the finger toward the disk surface. In preferred embodiments as shown in FIG. 5, the size of the cavities 118 may be graduated, this time increasing in length from the finger closer to the ID to the finger closer to the OD, to compensate for the increase in air bearing pressure resulting from the higher linear velocity at the disk perimeter and help ensure constant head flying height. Graduated negative pressure cavities may be used alone or in conjunction with graduated air bearing surfaces or graduated spring force flexures or both.

Figure 6A:
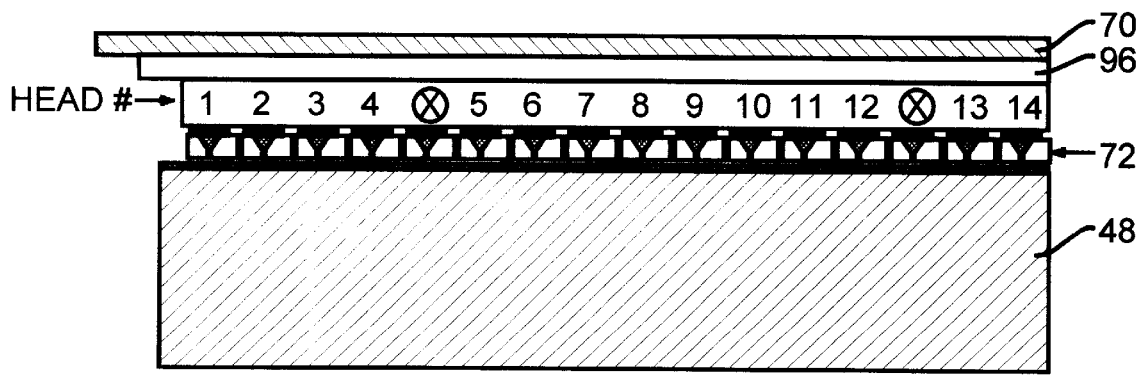
FIG. 6A is an enlarged side cross-sectional view of an arm assembly for a disk drive apparatus according to a fifth embodiment of the present invention, depicting a head numbering sequence.
Figure 6B:
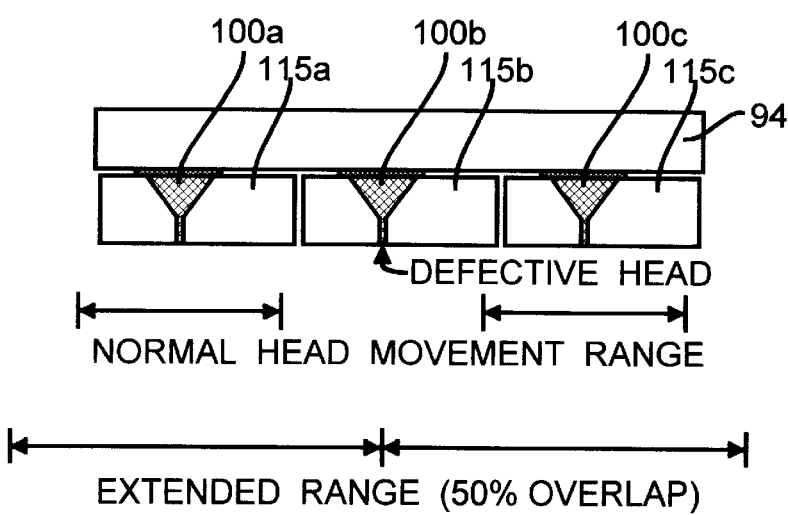
FIG. 6B is a further enlarged view of a segment of the head array of FIG. 6A depicting actuator movement used to compensate for a defective head.

FIG. 6A shows an enlarged side cross-sectional view of the head array assembly according to a fifth embodiment, which compensates for defective magnetic read and/or write heads. As illustrated in the figure, head elements are numbered for accessing purposes from the OD inward. Instead of requiring that all head elements on the head array be functional, when a defective head is discovered it is skipped and numbering continues with the next head. But rather than lose the band of disk surface that would normally be serviced by that head element, the maximum head array assembly movement range is increased. As shown in FIG. 6B the minimum range is extended such that head elements (100a and 100c in FIG. 6B) on either side of a defective element (100b in FIG. 6B) provide full coverage. Compensating for defective heads permits the use of head arrays that would otherwise be rejected and, thus, can increase manufacturing yield and decrease the cost of each head array.

Figure 7A:
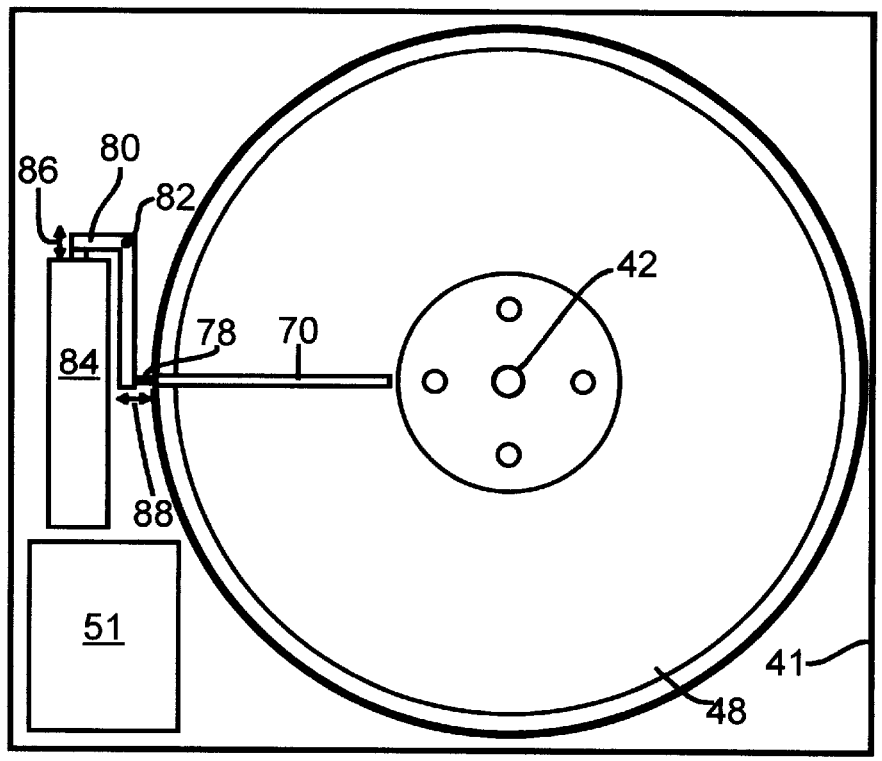
FIG. 7A is a top view of a disk drive apparatus employing a head array slider arm assembly and piezoelectric actuator according to a sixth embodiment of the present invention.
Figure 7B:
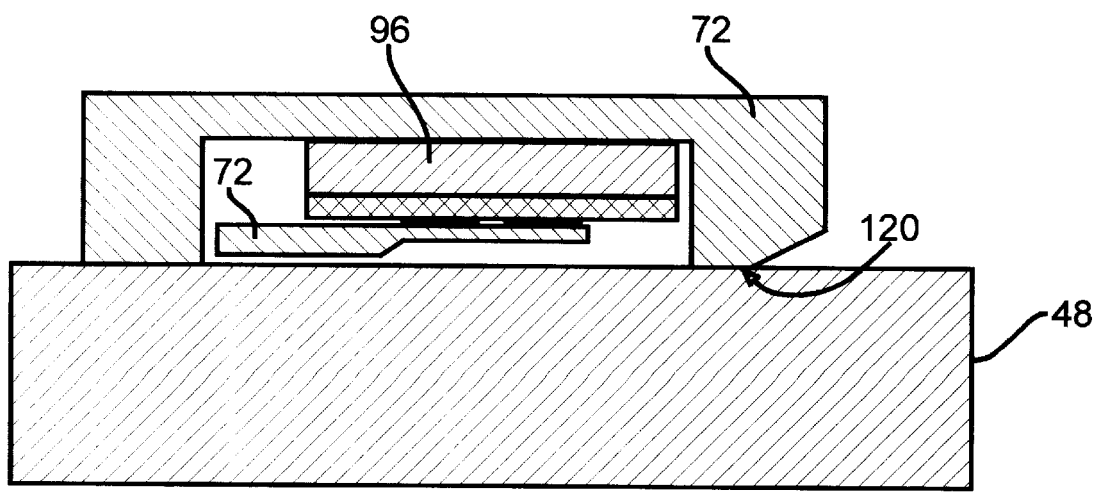
FIG. 7B is an enlarged cross-sectional view of the arm assembly of FIG. 7A.

A magnetic disk drive apparatus according to a sixth embodiment of the present invention is shown in FIG. 7A. This embodiment is substantially equivalent to the first embodiment except that the cross brace has been eliminated. A cross-sectional view of the head array assembly shown in FIG. 7B illustrates a difference in operation of this embodiment, with respect to the first embodiment. When the disk drive in not operational, i.e. the disk is not spinning, the head array 72 is retracted into the cavity of the support arm 70 as before, but now the support arm 70 itself settles onto the disk surface. In preferred embodiments, the contact surface 120 of the support arm is textured or otherwise treated to avoid stiction. On system start up, disk surface boundary layer air is forced under the support arm 70, effectively lifting it away from the surface. When operational speed is achieved, the support arm core 96 is expanded to locate the head array 72 in close proximity to the disk surface. The embodiment of FIGS. 7A and 7B may employ any suitable head array and, preferably, employs a head array 72 according to any of the above-described embodiments.

Figure 8:
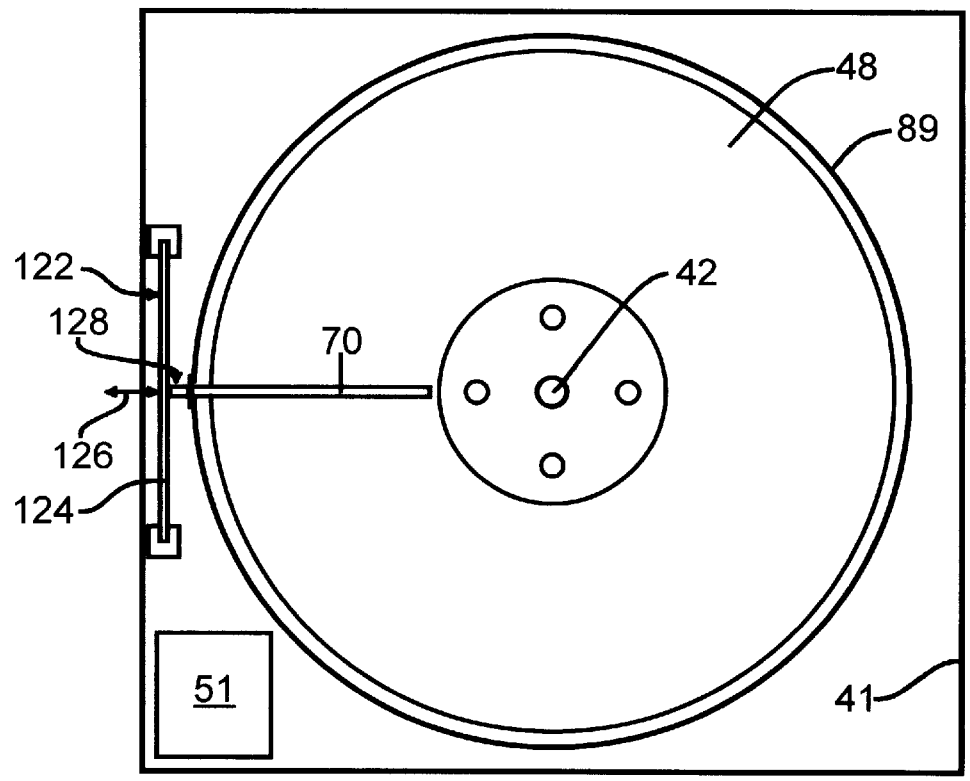
FIG. 8 is a top view of a disk drive apparatus employing a piezoelectric bender actuator according to a seventh embodiment.

A magnetic disk drive apparatus according to a seventh embodiment of the present invention is shown in FIG. 8. This embodiment is substantially equivalent to the sixth embodiment except that the actuator 84 and pivotal lever 80 have been replaced by a bender actuator device 122. The support arm 70 is coupled to the bender actuator device 122 by any suitable means, including the actuator coupling means described above. In one preferred embodiment, the bender actuator device 122 comprises an elongated piezoelectric element 124, comprising one or more thin, flexible metal layers and one or more thin layers of piezoelectric material, and thus are simple, reliable, and very low cost. The element 124 is fixed at each end with respect to the housing 41. When a voltage is applied to the actuator device 122 to actuate the piezoelectric material, the piezoelectric material expands or contracts, depending on the particular design, causing the device to bend, which results in movement in one of the directions of arrow 126, at the head array coupling location 128. In the magnetic disk implementation shown in FIG. 8, actuation of the bender moves the support arm and the head array slider radially, creating an extremely simple, robust, and fast disk drive. In other embodiments, a cross brace as described in the first embodiment may be used with the piezoelectric bender actuator embodiment. Also, the embodiment of FIG. 8 may employ any suitable head array and, preferably, employs a head array 72 according to any of the above-described embodiments.

Figure 9:
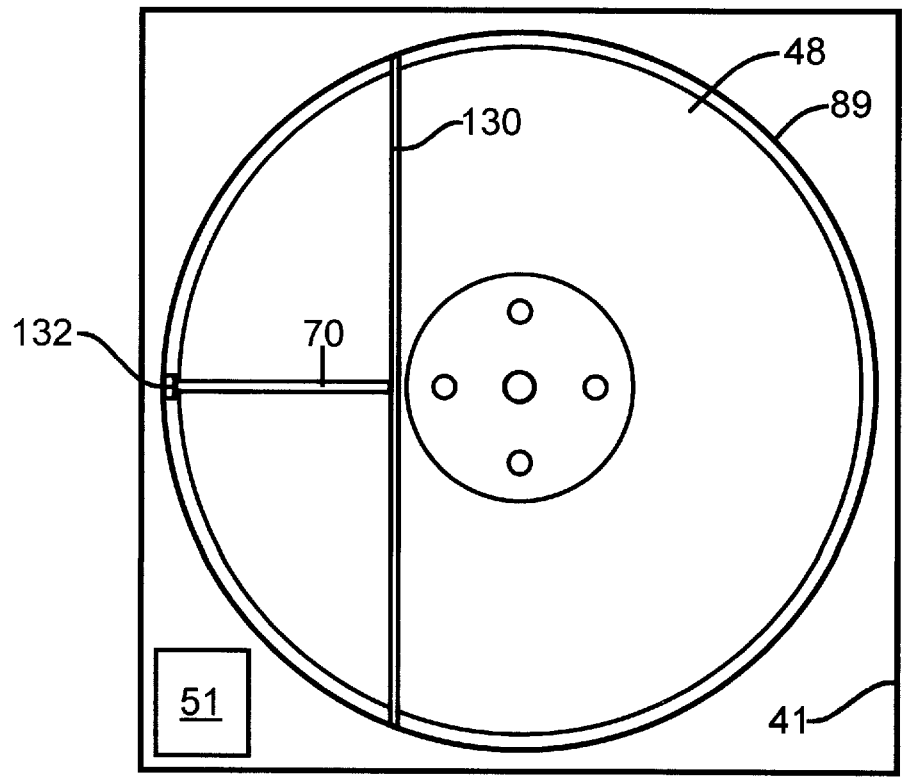
FIG. 9 is a top view of a disk drive apparatus employing an alternate bender actuator configuration according to an eighth embodiment.

A magnetic disk drive apparatus according to an eighth embodiment of the present invention is shown in FIG. 9, wherein a bender actuator is incorporated into the cross brace 130, placing it entirely within the hermetic chamber 89. By placing the actuator inside the partially evacuated chamber, the need for a flexible seal to transmit actuator motion is eliminated and chamber construction may be further simplified. The OD end of the support arm 70 may be held in place with respect to the chamber wall 89, for example, by a flexing or sliding connector 132. The embodiment of FIG. 9 may employ any suitable head array and, preferably, employs a head array 72 according to any of the above-described embodiments.

Figure 10:
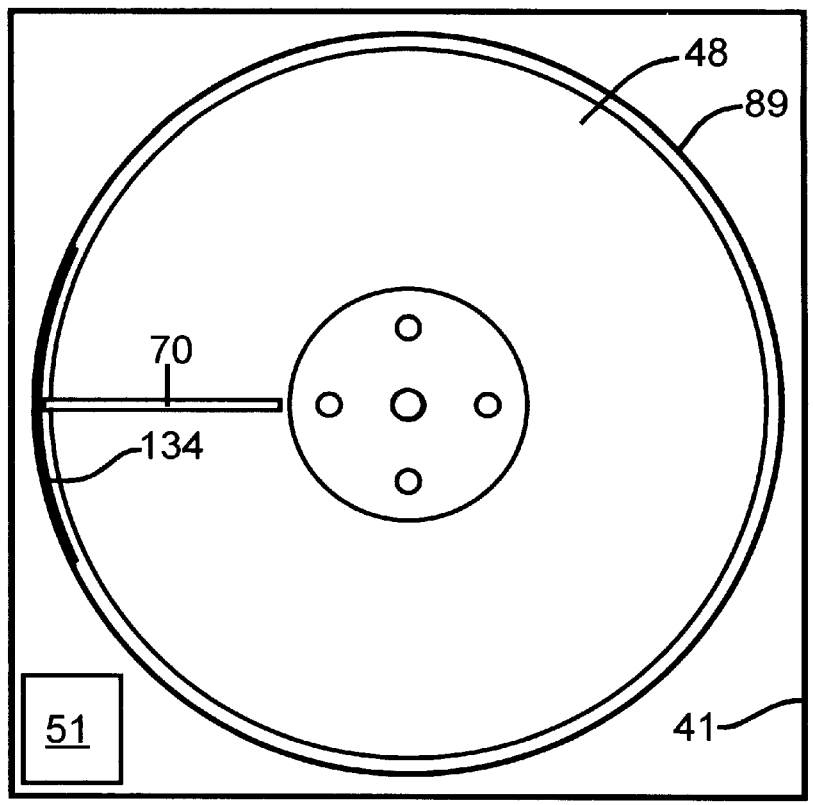
FIG. 10 is a top view of a disk drive apparatus employing an alternate bender actuator configuration according to a ninth embodiment.

A magnetic disk drive apparatus according to a ninth embodiment of the present invention is shown in FIG. 10, wherein a piezoelectric bender actuator 134 is shaped to conform to the interior curve of the hermetic chamber wall 89 and is placed entirely within the hermetic chamber, but otherwise functions similarly to the actuator in the seventh embodiment in FIG. 8. The curved bender actuator may be used with or without a support arm cross brace. The embodiment of FIG. 10 may employ any suitable head array and, preferably, employs a head array 72 according to any of the above-described embodiments.

Figure 11:
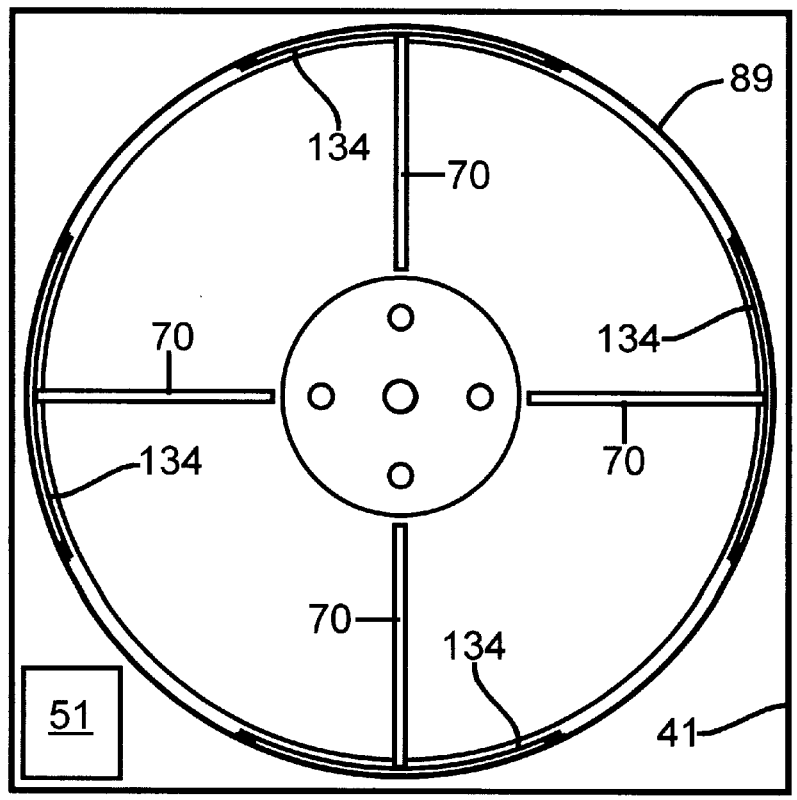
FIG. 11 is a top view of a disk drive apparatus employing multiple head array slider arm assemblies and piezoelectric actuators according to a tenth embodiment.

A magnetic disk drive apparatus according to a tenth embodiment of the present invention is shown in FIG. 11. Four curved bender actuators 134 and associated head array assemblies are placed at ninety degree intervals around the circumference of the disk, each functioning independently but otherwise identically to the previous embodiment. By spacing head arrays in this manner, rotational latency is effectively reduced by a factor of four, equivalent to a disk drive with the disk spinning four times as fast. Furthermore, each of the four head arrays may be activated simultaneously, providing four times the data transfer rate of a conventional design. The low cost and small dimensions of bender actuators make this arrangement feasible. In other embodiments more or less than four bender actuators may be used, at any appropriate spacing. Also, other multiple actuator embodiments may employ a plurality of circumferentially spaced bender actuator devices 122 and associated support arm connections as described above with respect to FIG. 8. The embodiment of FIG. 11 may employ any suitable head array and preferably employs a head array 72 according to any of the above-described embodiments.

Figure 12:
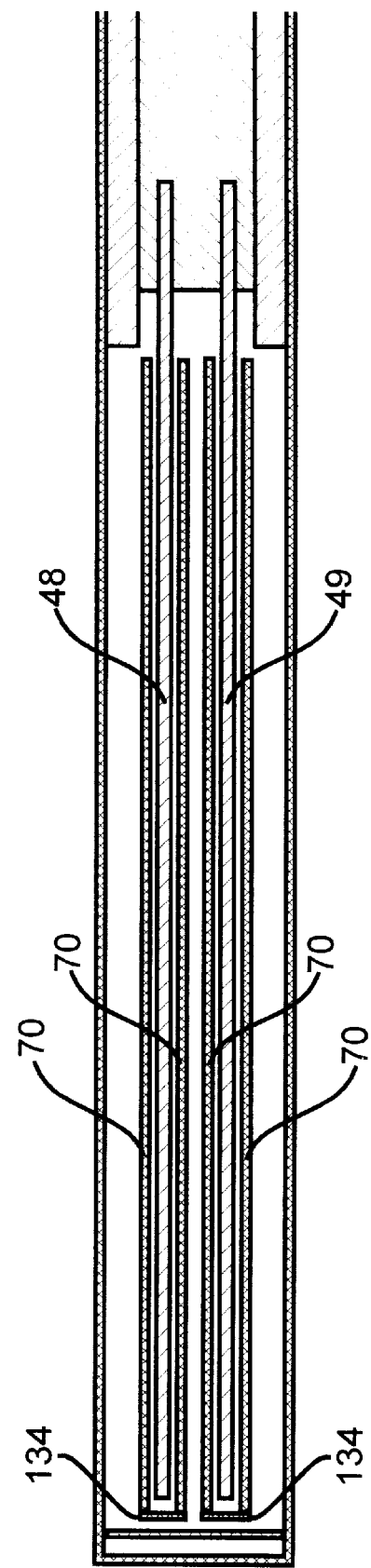
FIG. 12 is a side cross-sectional view of a portion of a disk drive apparatus employing multiple independent head array slider arm assemblies and piezoelectric actuators according to an eleventh embodiment of the present invention.

A magnetic disk drive apparatus according to an eleventh embodiment of the present invention is shown in a partial side cross-sectional view in FIG. 12. In this embodiment the disk drive contains a plurality of disks (two disks 48 and 49 are shown in the illustrated embodiment) and a corresponding plurality of independent piezoelectric bender-type actuator 134, one for each disk, used with or without cross braces. Unlike typical conventional multi-platter disk drives, where all read/write heads move in unison and only one surface may be accessed at a time, the design shown in FIG. 12 allows both disks to be accessed simultaneously and independently, providing up to twice the performance of a single actuator system. In other embodiments, one or more independent actuators may be included for each disk surface, rather than each disk, further increasing performance.

For example, in a disk drive with 8 disks, four independent actuators could be included for each disk surface, with one head array per actuator, for a total of 64 independent actuators and head arrays. Each actuator and head array slider by itself can provide a substantial system performance increase relative to conventional disk drives, by reducing head motion distance and head movement time. With 64 independent actuators and head arrays, total system performance is multiplied by up to another factor of 64, vastly outperforming even a large array of conventional disk drives. In addition, a further performance increase is made possible by the potential to read or write using multiple head elements simultaneously on each head array. For example, if eight heads are accessed at once rather than one, the data transfer rate is increased by another factor of eight.

FIGS. 13B–F show a head array assembly according to a twelfth embodiment of the present invention. This embodiment is similar to the first embodiment, shown in FIGS. 2A–J, and is versatile with regard to the type of head used in the system.

Figure 13A:
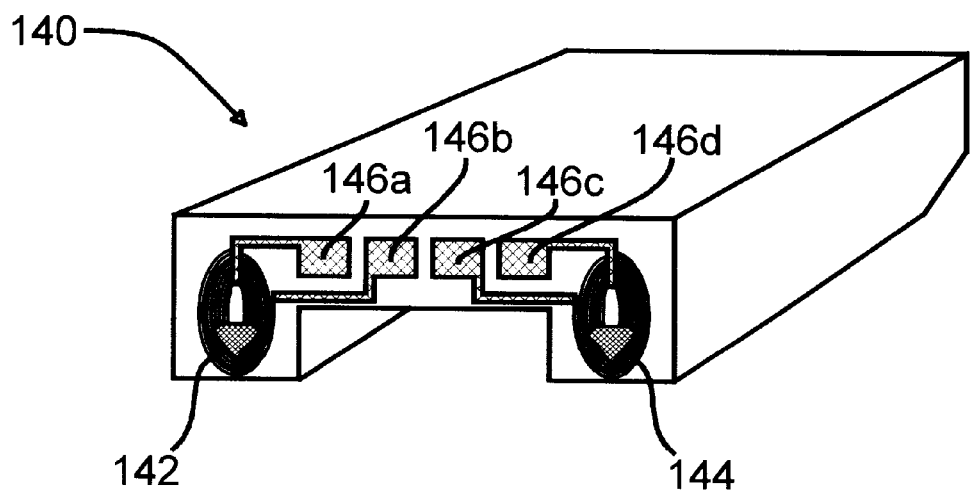
FIG. 13A is a perspective view of a conventional head slider structure.
Figure 13B:
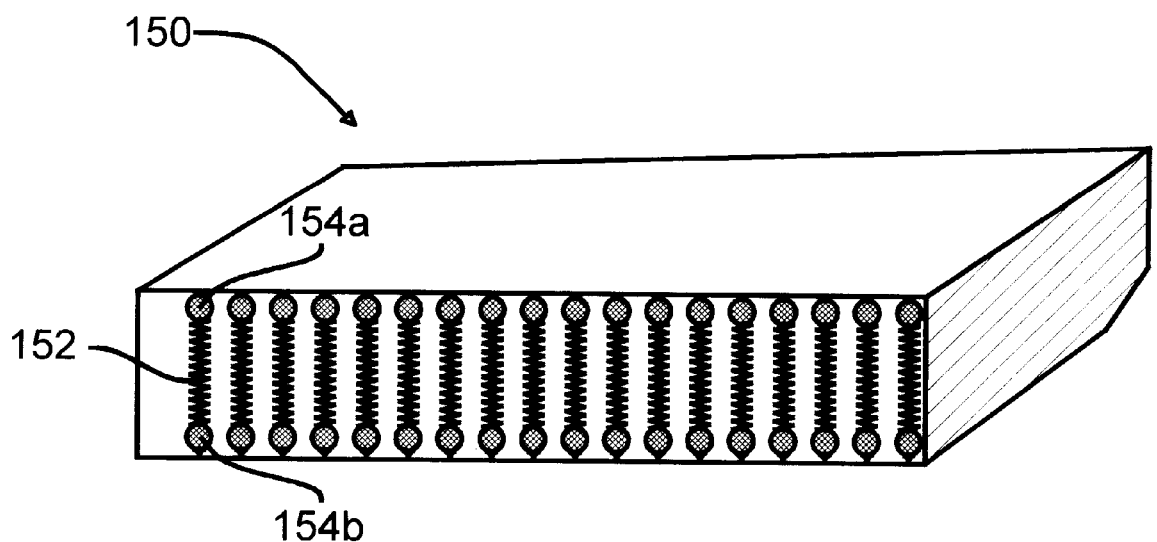
FIG. 13B is a perspective view of a head slider for a disk drive apparatus according to an embodiment of the present invention.

FIG. 13A shows an example of a conventional slider 140 with two inductive-type thin-film read/write heads 142 and 144 on the rear surface. As shown in the drawing, each end of the read/write coils is connected to a bonding pad 146a–d which is designed to be large enough to allow the attachment of external wires, thereby permitting communication between the heads and the disk drive electronics (not shown in FIG. 13A). FIG. 13B shows an alternative approach according to a preferred embodiment of the present invention. In the FIG. 13B embodiment, a slider 150 is provided with a plurality of heads, wherein each head includes a helical coil 152 in place of the typical planar coil, in order to minimize the head width, preferably to accommodate a greater number of heads for a given slider width. However, in further embodiments, other suitable inductive, magnetoresistive, or alternative type of heads could be used. Also, in accordance with preferred embodiments, instead of connecting the head via a circuit path to a large bonding pad, an insulating passivation layer is deposited over the head, leaving only a small window over each of the connection points, and a "solder bump" pads 154a and 154b are deposited over the windows. This allows many heads to be placed in close proximity on one slider.

Figure 13C:
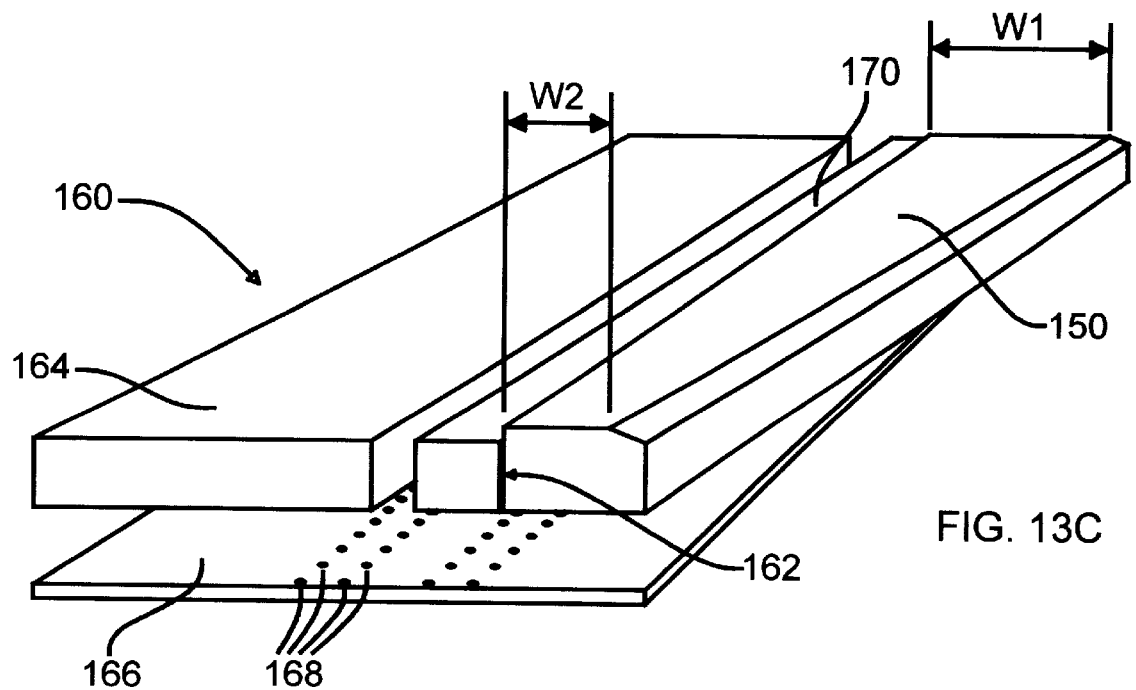
FIG. 13C is an exploded, perspective view of a head array slider assembly for a disk drive apparatus according to a twelfth embodiment of the present invention, including a head array slider as shown in FIG. 13B, prior to the step of cutting fingers.

FIG. 13C shows four components of a head array assembly 160 according to a preferred embodiment of the present invention. The head array slider of FIG. 13C includes a slider 150, configured similar to that of FIG. 13B, with the connection pads on the surface 162 facing to the left (and hidden from view) in the drawing. In preferred embodiments, the slider 150 is configured with a greater width W1 at one end (the end to be positioned closer to the disk ID) than the width W2 at the other end (the end to be positioned closer to the disk OD), for providing a greater slider surface area to compensate for decreased air velocity at locations closer to the disk ID, as discussed previously.

The head array assembly 160 also includes an arm electronics chip 164, containing head switching circuitry, read pre-amp, and write amp circuitry for the plural heads. The connection pads provided on the electronics chip 164 are provided on the downward facing surface (hidden from view) in the drawing of FIG. 13C. The head array assembly further includes a circuit board 166, provided with suitable connection pads 168 on the upward facing surface in the drawing and connection circuits (not shown) embedded underneath. The connection pads 168 are positioned to align with and connect to corresponding connection pads on the downward facing surface of the electronics chip 164. However, as noted above, in preferred embodiments, the slider connection pads are located on the surface 162 of the slider 150, which faces to the left in the drawing. In such embodiments, a coupling member 170 may be disposed adjacent the slider surface 162, to electrically couple the connection pads on the slider surface 162 to the appropriate connection pads 168 on the circuit board 166.

Figure 13D:
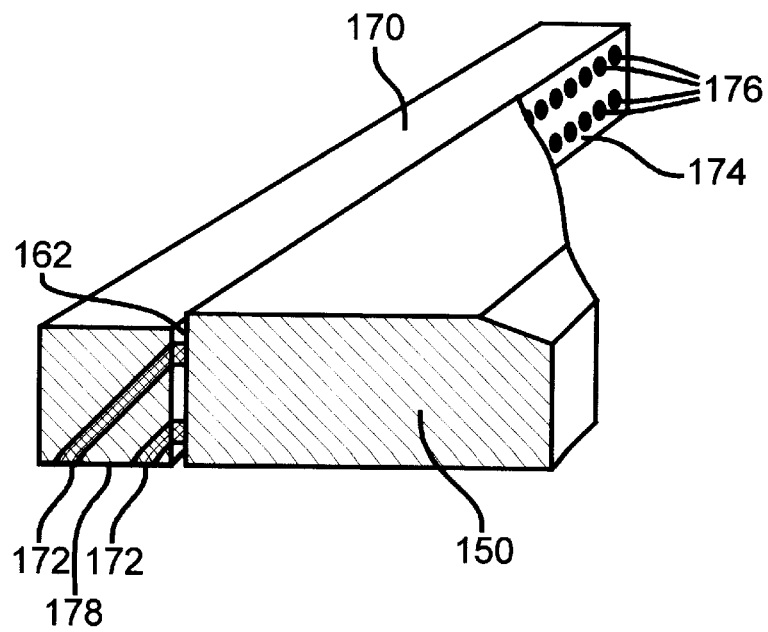
FIG. 13D is a side-perspective cross-section view of the head array slider and coupling member of FIG. 13C.

In the illustrated embodiment in FIG. 13D, a coupling member 170 comprises an elongated member of electrically insulating material, through which a plurality of conductive paths 172 are provided. The coupling member 170 defines a first surface 174 facing the slider 162 and at which one end of each conductive path 172 has a corresponding connection pad 176. The coupling member 170 also defines a second surface 178 (facing downward in FIGS. 13C and D) at which the other end of each conductive path 172 has a further corresponding connection pad (not shown). The connection pads on the downward facing surface 178 of the coupling member 170 in FIG. 13C are arranged to align with and electrically connect to corresponding connection pads 168 on the upward facing surface of the circuit board 166 shown in FIG. 13C. Similarly, the connection pads 176 on the slider-facing surface 174 of the coupling member 170 are arranged to align with and electrically connect to corresponding connection pads 154a and 154b on the slider 150 (FIG. 13B). In preferred embodiments, the slider-facing surface of the coupling member 170 has a contour that matches or mates with the contour of the coupling-member-facing surface of the slider 150, so that the coupling member and the slider may be arranged in close proximity, and preferably, abutment, when electrically coupled to each other. While the embodiment illustrated in FIGS. 13C and D includes a coupling member 170 and a slider 150, formed as separate parts, further preferred embodiments may include a suitable coupling member formed integral with the slider.

In accordance with preferred embodiments, the coupling member 170 and the arm electronics chip 164 are soldered directly to the circuit board 166 and the head array slider 150 is soldered to the coupling member 170, in the positions shown in FIG. 13C. The head array slider 150 and the circuit board 166 may be permanently bonded together in this position using a conventional adhesive.

Figure 13E:
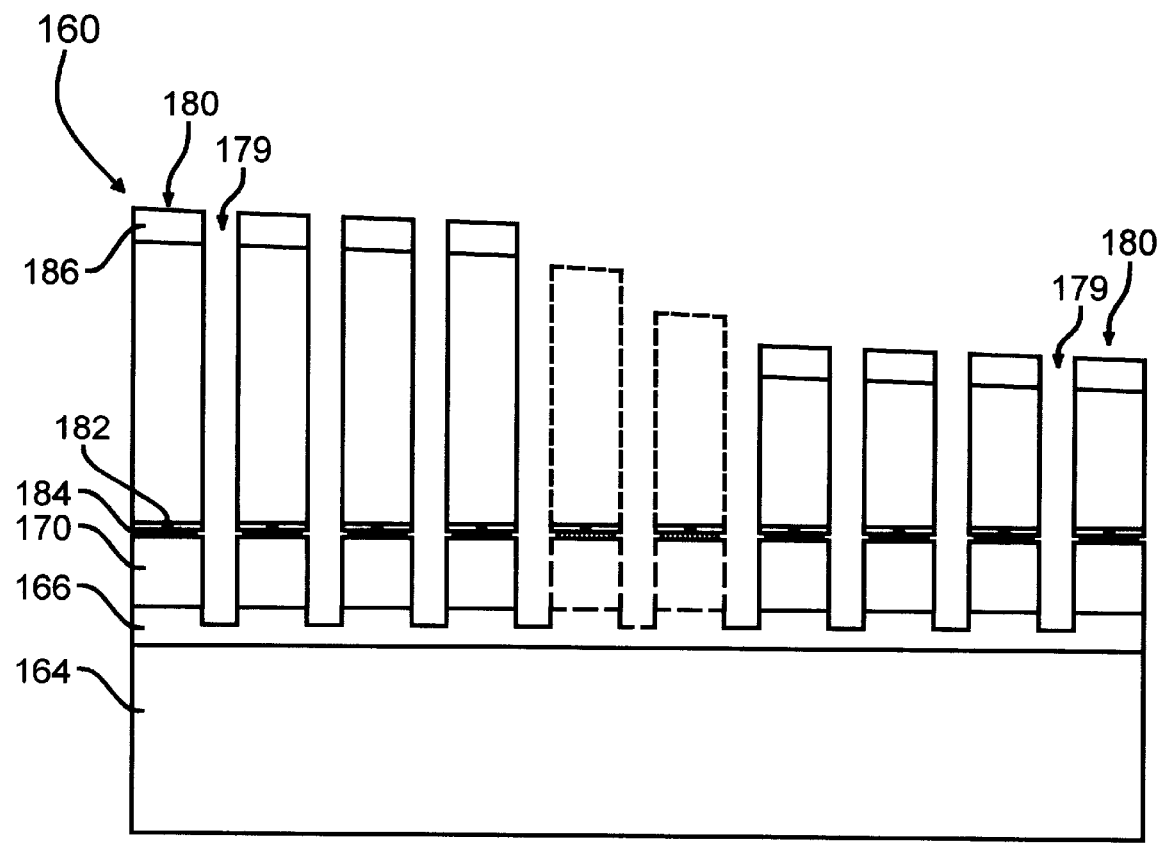
FIG. 13E is a bottom view of the head array slider assembly of FIG. 13C, after the step of cutting fingers.
Figure 13F:
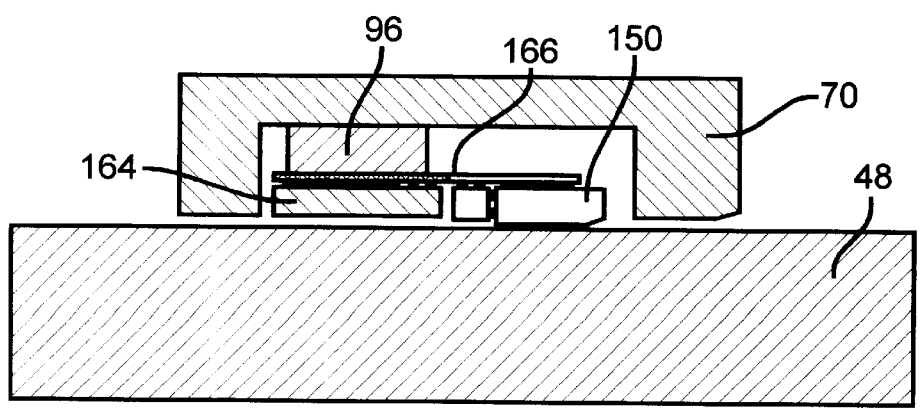
FIG. 13F is an enlarged cross-sectional view of an arm assembly of a disk drive apparatus, employing the head array slider assembly of FIG. 13E.

In the next step, a cutting tool, such as, but not limited to, a diamond dicing blade or gas laser is used to cut narrow slots 179 through the slider 150, between each of the read/write heads and through the coupling member 170 and underlying portion of the circuit board 166. This results in fingers 180, as shown in FIG. 13E, each of which contains one head of the head array slider 150, an air bearing surface composed of a finger portion of the head array slider 150, a finger portion of the connector member containing a pair of conductors 172 corresponding to the associated head, and a portion of the circuit board connecting the head and connector member to the arm electronics chip. In further embodiments, the slots 179 may be cut between every two, three or any suitable number of heads, such that each finger 180 includes more than one head. The circuit board 166 may then be coupled to the expandable core 96 as shown in FIG. 13F. Alternatively, a plurality of flextures may be disposed between the circuit board 166 and the core 96, similar to the flextures 116 in FIGS. 3A and 3B.

When the head array assembly 160 is installed in a disk drive with the slider elements in close proximity to the disk surface as shown in FIG. 13F, each finger 180 flexes independently to maintain proper separation between the slider and the disk surface. In the embodiment illustrated in FIG. 13E, each finger 180 includes one head and defines a head gap 182 and a pair of solder bumps 184 between the finger portion of the slider 150 and the finger portion of the coupling member 170. The free end of each finger includes a portion of the beveled end 186 of the slider 150, to help force air under the finger during operation. The remaining elements of this embodiment are similar to those in the first embodiment, shown in FIGS. 2A–J, and function in the same manner.

In any of the above-discussed embodiments utilizing a cross brace, the cross brace may be replaced with a stationary structure (such as an annular ring-like member) disposed adjacent the central portion of the disk and connected to each head array support arm by a flexure or suitable elastic or sliding member.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A data storage and retrieval system for reading and/or writing data onto at least one data storage disk defining at least one recording surface having a radial dimension and at least one data track directed generally traverse to the radial dimension, the system comprising:
    a housing having an interior for receiving said at least one data storage disk;
    means for rotating said at least one data storage disk, upon said disk being received in the housing interior;
    a head array comprising a plurality of read and/or write heads arranged in a longitudinal dimension, for communicating with at least one recording surface of at least one data storage disk;
    a head array support arm disposed within the housing interior for supporting the head array adjacent at least one recording surface of at least one data storage disk, with the longitudinal dimension of the arrangement of heads extending in a cross-track direction of the adjacent disk recording surface; and
    an actuator coupled to selectively move the head array support arm and head array in a cross-track direction;
    wherein said head array comprises a longitudinal member defining a plurality of fingers separated by slots, each finger having at least one of said read/write heads, and wherein said fingers are flexible substantially independent of each other; and
    wherein said head array defines an inside diameter end disposed proximal to the inside diameter of the disk and an outside diameter end disposed proximal to the outside diameter of the disk and wherein said fingers vary in length from greater length to shorter length in the direction from the inside diameter toward the outside diameter.

2. A system as recited in claim 1, wherein the actuator comprises a piezoelectric actuator.

3. A system as recited in claim 2, wherein the piezoelectric actuator comprises a piezoelectric stack.

4. A system as recited in claim 2, wherein the piezoelectric actuator comprises a piezoelectric bender.

5. A system as recited in claim 1, further comprising an expandable mount coupling the head array to the head array support arm, for selectively moving the head array between a first position and a second position, wherein the second position is closer to the disk surface than the first position.

6. A system as recited in claim 5, wherein said expandable mount comprises a piezoelectric structure.

7. A system as recited in claim 1, wherein the head array support arm defines a channel in which an expandable mount is disposed, the expandable mount coupling the head array to the head array support arm, for selectively moving the head array between a first position and a second position, wherein the first position is closer to the disk surface than the second position.

8. A system as recited in claim 1, wherein each head in the head array includes a helical coil.

9. A system as recited in claim 1, further comprising an air-tight chamber containing said at least one disk, said head array and said head array support arm.

10. A system as recited in claim 9, wherein said actuator is located outside of said air-tight chamber.

11. A system as recited in claim 1, further comprising:
    an air-tight chamber defining a chamber interior containing said at least one disk, said head array and said head array support arm and further defining a chamber exterior at which said actuator is located;
    a flexible seal coupling said actuator to said head array support arm.

12. A system as recited in claim 1, wherein said head array defines an inside diameter end disposed proximal to the inside diameter of the disk and an outside diameter end disposed proximal to the outside diameter of the disk and wherein each of said fingers defines a surface having a cavity facing the disk and wherein the cavity dimension varies from finger to finger, from smaller cavity dimensions to larger cavity dimensions in the direction from the inside diameter toward the outside diameter.

13. A system as recited in claim 1, wherein the support arm defines a first end and a second end, said first end coupled to said actuator and wherein said system further comprises a cross brace coupled to support the second end of the support arm.

14. A data storage and retrieval system for reading and/or writing data onto at least one data storage disk defining at least one recording surface having a radial dimension and at least one data track directed generally traverse to the radial dimension, the system comprising:
    a housing having an interior for receiving said at least one data storage disk;
    means for rotating said at least one data storage disk, upon said disk being received in the housing interior;

a head array comprising a plurality of read and/or write heads arranged in a longitudinal dimension, for communicating with at least one recording surface of at least one data storage disk;

a head array support arm disposed within the housing interior for supporting the head array adjacent at least one recording surface of at least one data storage disk, with the longitudinal dimension of the arrangement of heads extending in a cross-track direction of the adjacent disk recording surface; and an actuator coupled to selectively move the head array support arm and head array in a cross-track direction;

wherein said array comprises a longitudinal member defining a plurality of fingers separated by slots, each finger having at least one said read/write heads, and wherein said fingers are flexible substantially independent of each other; and wherein said head array defines an inside diameter end disposed proximal to the inside diameter the disk and an outside diameter end disposed proximal to the outside diameter of the disk and wherein each of said fingers has a first portion defining a first thickness dimension and a second portion defining a second thickness dimension greater than the first thickness dimension, and wherein the length along each finger of the second portion varies from finger to finger, from shorter dimensions to longer dimensions in the direction from the outside diameter toward the inside diameter.

15. A data storage and retrieval system for reading and/or writing data onto at least one data storage disk defining at least one recording surface having a radial dimension and at least one data track directed generally traverse to the radial dimension, the system comprising:

a housing having an interior for receiving said at least one data storage disk;

means for rotating said at least one data storage disk, upon said disk being received in the housing interior;

a head array comprising a plurality of read and/or write heads arranged in a longitudinal dimension, for communicating with at least one recording surface of at least one data storage disk;

a head array support arm disposed within the housing interior for supporting the head array adjacent at least one recording surface of at least one data storage disk, with the longitudinal dimension of the arrangement of heads extending in a cross-track direction of it the adjacent disk recording surface; and an actuator coupled to selectively move the head array support arm and head array in a cross-track direction:

wherein said head array defines an inside diameter end disposed proximal to the inside diameter of the disk and an outside diameter end disposed proximal to the outside diameter of the disk;

wherein said head array defines a plurality of head sections, wherein each head section includes at least one of said read/write heads and defines a first thickness dimension along a first portion of the head section and a second thickness dimension along the rest of the head section; and wherein the length of the first portion of the sections vary from a greater length to a shorter length in the direction from the inside diameter toward the outside diameter.

* * * * *